(12) United States Patent
Lee

(10) Patent No.: US 10,258,184 B2
(45) Date of Patent: Apr. 16, 2019

(54) COOKING VESSEL HAVING CONCAVO-CONVEX COATING LAYER

(71) Applicant: BLACKCUBE Co., Ltd., Siheung-si, Gyeonggi-do (KR)

(72) Inventor: ChangHo Lee, Ansan-si (KR)

(73) Assignee: BLACKCUBE Co., Ltd., Siheung-si, Gyeonggi-do (KR)

( * ) Notice: Subject to any disclaimer, the term of this patent is extended or adjusted under 35 U.S.C. 154(b) by 128 days.

(21) Appl. No.: 15/099,981

(22) Filed: Apr. 15, 2016

(65) Prior Publication Data

US 2017/0245672 A1    Aug. 31, 2017

(30) Foreign Application Priority Data

Feb. 29, 2016  (KR) .................. 10-2016-0024561

(51) Int. Cl.
*A47J 27/02* (2006.01)
*A47J 36/02* (2006.01)
*A47J 27/00* (2006.01)

(52) U.S. Cl.
CPC ............ *A47J 27/02* (2013.01); *A47J 27/002* (2013.01); *A47J 36/025* (2013.01)

(58) Field of Classification Search
CPC ........ A47J 27/02; A47J 27/002; A47J 27/022; A47J 36/02; A47J 36/025
USPC ..................................................... 220/573.2
See application file for complete search history.

(56) References Cited

U.S. PATENT DOCUMENTS

| 1,460,380 A | * | 7/1923 | Hughes | .................. A47J 37/10 |
| | | | | 126/376.1 |
| D682,012 S | * | 5/2013 | Lin | ............................... D7/354 |
| 2015/0108143 A1 | * | 4/2015 | Groll | ....................... A47J 36/02 |
| | | | | 220/573.2 |

FOREIGN PATENT DOCUMENTS

| KR | 10-0415876 B1 | 1/2004 |
| KR | 10-2009-0118347 A1 | 11/2009 |
| KR | 10-1306682 B1 | 9/2013 |

* cited by examiner

*Primary Examiner* — Andrew T Kirsch
(74) *Attorney, Agent, or Firm* — Rudy J. Ng; Bret E. Field; Bozicevic, Field & Francis LLP

(57) ABSTRACT

A cooking vessel having a concavo-convex coating layer formed thereon is provided, in which concavo-convex portions are formed on an outer surface of the cooking vessel and a coating layer is formed on an upper and inner portion of the concavo-convex portions, so that quick cooking can be achieved through an enlarged heat transfer area and prominent heat absorption through the coating layer, scratching or slipping can be prevented from occurring, and cleaning of the cooking vessel can be easily performed through a non-stick function. The cooking vessel includes a vessel portion configured to accommodate a food material to be cooked therein, a first concavo-convex portion formed on an outer surface of the vessel portion and including first projections formed in a solid line and second projections formed in a dotted line, and a coating layer formed on an upper portion and an inner portion of the first concavo-convex portion.

8 Claims, 5 Drawing Sheets

[FIG. 1]

COOKING VESSEL HAVING CONCAVO-CONVEX COATING LAYER

CROSS-REFERENCE TO RELATED APPLICATION

This application is based on and claims priority from Korean Patent Application No. 10-2016-0024561 filed on Feb. 29, 2016 in the Korean Intellectual Property Office, the disclosure of which is incorporated herein in its entirety by reference.

TECHNICAL FIELD

The present disclosure relates to the processing of inner and outer surfaces of a cooking vessel made of a metal material, such as a frypan.

BACKGROUND OF THE INVENTION

As is generally known, various kinds of cooking vessels are used for the purpose of cooking food in a restaurant or at home. Such cooking vessels include frypans or pans with various sizes and shapes, and may be selectively used in accordance with the characteristics of the food to be cooked.

Such a cooking vessel is generally formed of a metal material having preset thermal conduction and strength, and may be provided with a handle that is formed on one side or both sides of the cooking vessel so that a user can safely grasp the handle and a cover that is provided to prevent a loss of heat during cooking and to prevent the food being cooked from spattering out of the cooking vessel.

The metal material used to manufacture the cooking vessel may be stainless steel, casting material, or an aluminum alloy, and the inner surface of the cooking vessel is coated with a ceramic coating agent to show non-stick function. However, since the ceramic coating agent has the problem that the food being cooked is apt to stick thereto after a predetermined use period, a Teflon coating agent has been developed and widely used.

The Teflon coating agent may include PFOA (Perfluorooctanoic Acid) in accordance with the kind thereof, and the PFOA is an environmental hazardous material that is regulated as a use-restricted item in advanced nations in which noxiousness of the PFOA has been deeply recognized. Accordingly, a cooking vessel coated with a ceramic coating agent that is innoxious to a human body is recently preferred.

As described above, the ceramic coating agent and the Teflon coating agent in the related art have advantages and disadvantages. In common, they have the problems that the non-stick function thereof deteriorates due to scratches that are repeatedly formed on the surface of the cooking vessel in the cooking or cleaning process after a predetermined use period.

Further, in order to maintain the fine appearance, a pattern layer having various kinds of patterns is formed on an outer surface of the cooking vessel, and concentric projections are formed on a bottom surface of the cooking vessel that comes in direct contact with fire to prevent slipping.

In the case of forming the patterns, offset printing, silk screening printing, and transfer printing using transfer sheets may be used. The offset printing has advantages that printing can be performed even on a curved portion of the cooking vessel, but also has disadvantages that the expensive printing cost causes the manufacturing cost of the cooking vessel to be increased. Further, the silk screening printing or the transfer printing has advantages of inexpensive printing costs, but also has disadvantages that it is not possible to perform printing on the curved portion of the cooking vessel to restrict the finishing process.

As described above, the patterns formed in the related art has no expectable effect except for maintaining of the fine appearance of the cooking vessel, and the concentric projections that are formed on the bottom surface to prevent slipping have the problem that it is difficult to process the projections together during the above-described printing process. Further, since the projections are formed limitedly on the bottom surface of the cooking vessel, it is difficult to expect an increased heat transfer area.

PRIOR ART DOCUMENT (1) Korean Registered Patent No. 10-0415876 (Registered on Jan. 8, 2004)
(2) Korean Registered Patent No. 10-1306682 (Registered on Sep. 4, 2013)
(3) Korean Patent Application Publication No. 10-2009-0118347 (Published on Nov. 18, 2009)

SUMMARY OF THE INVENTION

Accordingly, the present disclosure has been made to solve the aforementioned problems occurring in the related art, and one subject to be achieved by the present disclosure is to provide a cooking vessel having a concavo-convex coating layer, which can achieve quick cooking through an enlarged heat transfer area and prominent heat absorption, can prevent a safety accident from occurring through prevention of slipping, and can be cleaned without food sticking, scratching, and peeling off through a non-stick function.

In accordance with one aspect of the present disclosure, there is provided a cooking vessel, which includes a vessel portion configured to accommodate a food material to be cooked therein; a first concavo-convex portion formed on an outer surface of the vessel portion and including first projections formed in a solid line and second projections formed in a dotted line; and a coating layer formed on an upper portion and an inner portion of the first concavo-convex portion.

The cooking vessel according to the aspect of the present disclosure may further include a second concavo-convex portion formed on a boundary line of the first concavo-convex portion that is formed on the outer surface of the vessel portion to finish the first concavo-convex portion, wherein the second concavo-convex portion includes third projections formed in a solid line and positioned in a horizontal direction and fourth projections formed in a solid line and positioned in a diagonal direction.

The cooking vessel according to the aspect of the present disclosure may further include a third concavo-convex portion formed on an inner bottom surface of the vessel portion, wherein the third concavo-convex portion includes fifth projections and sixth projections formed in a dotted line.

The cooking vessel according to the aspect of the present disclosure may further include a fourth concavo-convex portion formed on an inner side surface of the vessel portion, wherein the fourth concavo-convex portion includes seventh projections and eighth projections formed in a solid line.

The first projections may be repeatedly formed in a honeycomb shape, and the second projections may be formed so that opposite vertices among inner vertices of the first projections are connected to each other.

The third projections may be formed to be stacked in a horizontal direction in a state where three of the third projections are spaced apart from each other for a predetermined distance, and the fourth projections may be formed on an inner lower side and an upper side of the third projections in different directions.

The fifth projections may be repeatedly formed in a honeycomb shape, and the sixth projections may be formed so that opposite vertices among inner vertices of the fifth projections are connected to each other.

The seventh projections may be repeatedly formed in a honeycomb shape, and the eighth projections may be formed so that opposite vertices among inner vertices of the seventh projections are connected to each other.

The cooking vessel according to the aspect of the present disclosure may further include coating layers respectively formed on upper portions and inner portions of the second to fourth concavo-convex portions.

The coating layers formed on the inner portions of the first to fourth concavo-convex portions may be formed with a height that is lower than a projection height of the first to fourth concavo-convex portions.

According to the cooking vessel having the concavo-convex coating layer as described above, quick cooking can be achieved through an enlarged heat transfer area and prominent heat absorption, and a safety accident can be prevented from occurring through prevention of slipping. Further, the cooking vessel can be cleaned without food sticking, scratching, and peeling off through the non-stick function.

BRIEF DESCRIPTION OF THE DRAWINGS

The above objects, other features and advantages of the present disclosure will become more apparent by describing the preferred embodiments thereof with reference to the accompanying drawings, in which.

DETAILED DESCRIPTION OF THE INVENTION

Hereinafter, preferred embodiments of the present disclosure will be described in detail with reference to the accompanying drawings.

Figure 1:
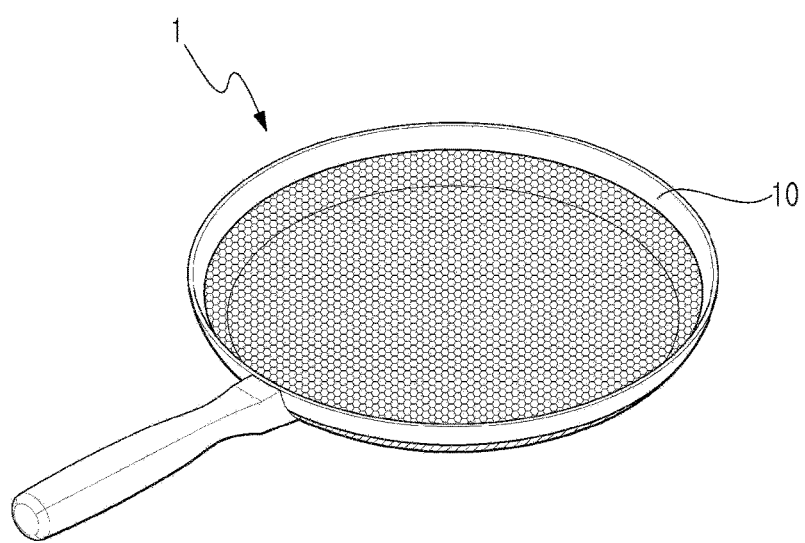
FIG. 1 is a perspective view of a cooking vessel having a concavo-convex coating layer formed thereon according to an embodiment of the present disclosure.
Figure 2:
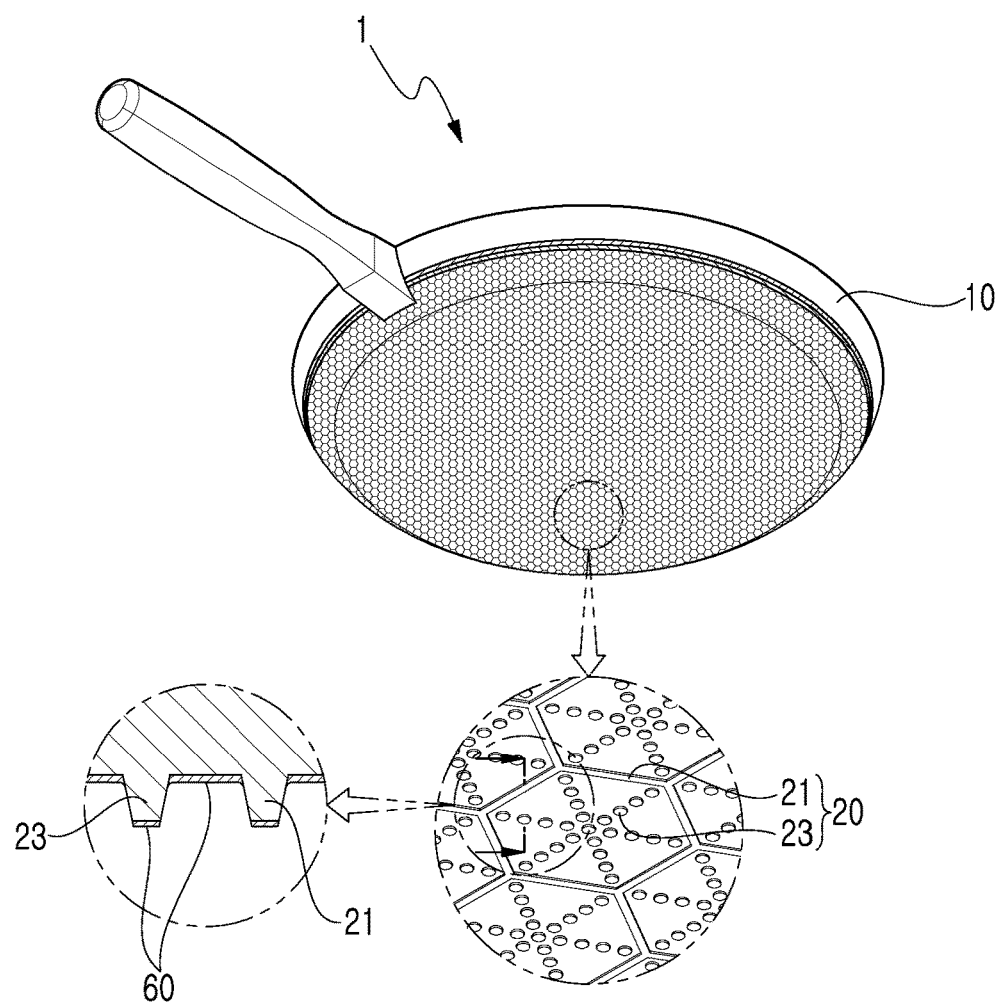
FIG. 2 is a partially enlarged view of a cooking vessel having a concavo-convex coating layer formed thereon according to an embodiment of the present disclosure.
Figure 3:
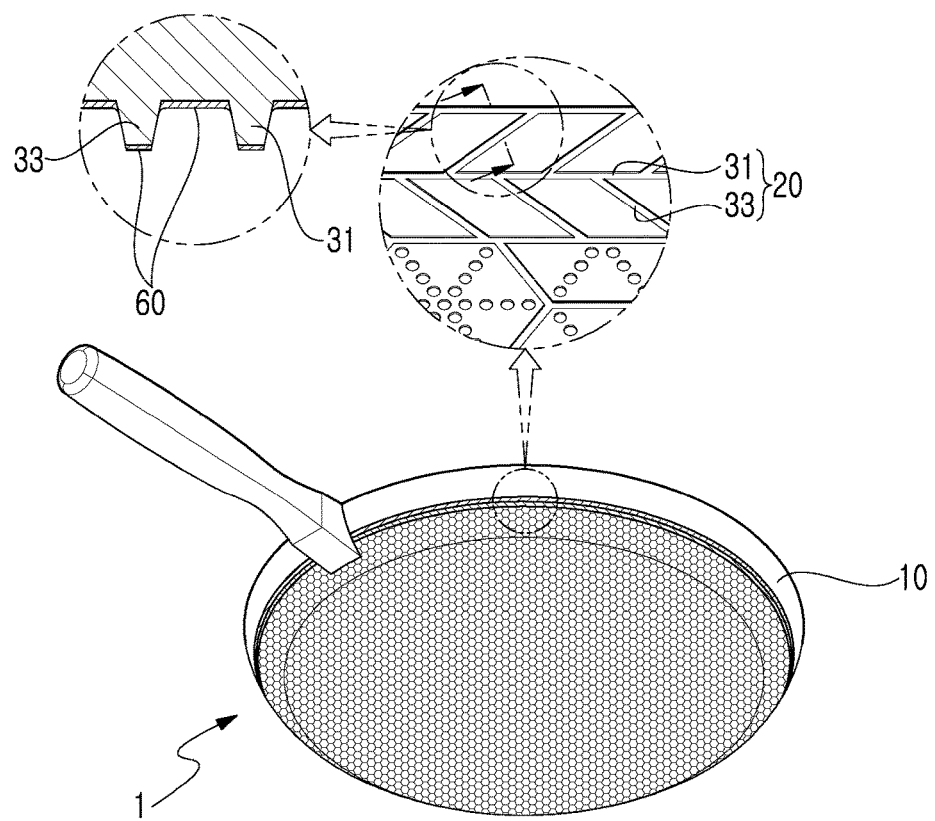
FIG. 3 is another partially enlarged perspective view of a cooking vessel having a concavo-convex coating layer formed thereon according to an embodiment of the present disclosure.
Figure 4:
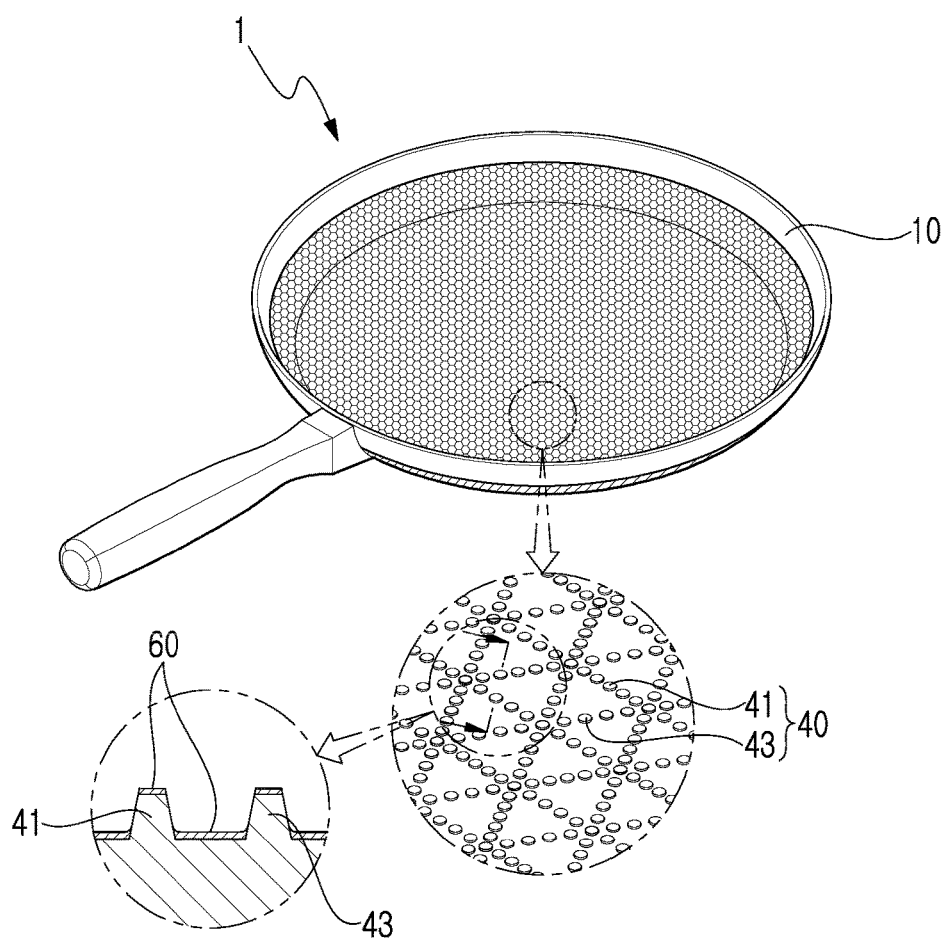
FIG. 4 is a still another partially enlarged perspective view of a cooking vessel having a concavo-convex coating layer formed thereon according to an embodiment of the present disclosure.
Figure 5:
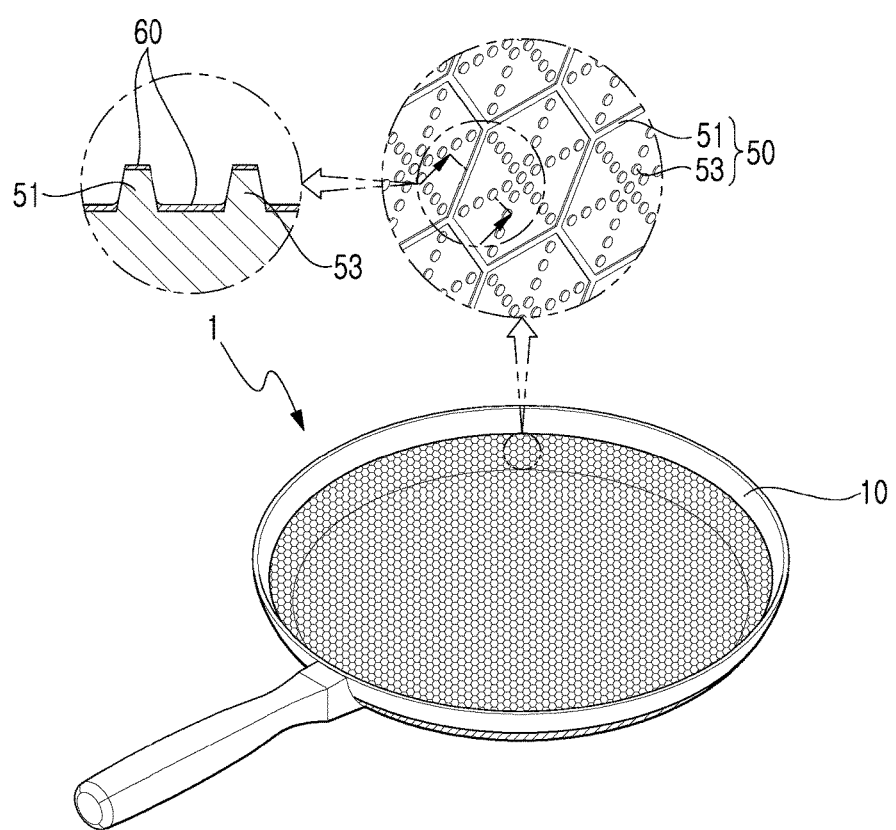
FIG. 5 is a yet still another partially enlarged perspective view of a cooking vessel having a concavo-convex coating layer formed thereon according to an embodiment of the present disclosure.

FIG. 1 is a perspective view of a cooking vessel having a concavo-convex coating layer formed thereon according to an embodiment of the present disclosure, and FIG. 2 is a partially enlarged view of a cooking vessel having a concavo-convex coating layer formed thereon according to an embodiment of the present disclosure. FIG. 3 is another partially enlarged perspective view of a cooking vessel having a concavo-convex coating layer formed thereon according to an embodiment of the present disclosure, FIG. 4 is a still another partially enlarged perspective view of a cooking vessel having a concavo-convex coating layer formed thereon according to an embodiment of the present disclosure, and FIG. 5 is a yet still another partially enlarged perspective view of a cooking vessel having a concavo-convex coating layer formed thereon according to an embodiment of the present disclosure.

A cooking vessel according to an embodiment of the present disclosure includes a vessel portion configured to accommodate a food material to be cooked therein, a first concavo-convex portion formed on an outer surface of the vessel portion and including first projections formed in a solid line and second projections formed in a dotted line, and a coating layer formed on an upper portion and an inner portion of the first concavo-convex portion.

Hereinafter, the overall configuration and the operation of the cooking vessel 1 having a concavo-convex coating layer formed thereon according to an embodiment of the present disclosure will be described in detail with reference to FIGS. 1 to 5.

The vessel portion 10 accommodates a food material to be cooked therein, and serves to cook the accommodated food material by means of heat being supplied thereto. The vessel portion 10 is formed of a metal material having prominent heat resistance and strength. A handle that can be grasped by a user is formed on one side or both sides of the vessel portion 10, and an upper portion of the vessel portion 10 is selectively covered by a cover. Cooking vessels include frypans or pans with various sizes and shapes, and in an embodiment of the present disclosure, explanation will be made on the basis of the frypan.

A first concavo-convex portion 20 is formed on an outer surface of the vessel portion 10 and includes projections and grooves formed on an outer bottom and a side portion of the vessel portion 10 up to a predetermined height.

Referring to FIG. 2, the first concavo-convex portion 20 is composed of first projections 21 formed in a solid line and second projections 23 formed in a dotted line. The first projections 21 are repeatedly formed in a honeycomb shape, and the second projections 23 are formed in "*" shape so that vertices thereof and inner vertices of the first projections 21 cross each other. That is, six honeycombs that are different from each other are respectively connected to six sides of a regularly hexagonal honeycomb, and the first projections 21 are successively arranged on the bottom and the side portion of the vessel portion 10 in the above-described pattern. Further, the second projections 23 are formed by three dotted lines that connect the inner vertices of the regularly hexagonal honeycomb to each other, and the three dotted lines cross each other at the inner center point of the honeycomb.

First, through the first concavo-convex portion 20 that is formed to project from the vessel portion 10, the heat transfer area of an outer surface of the vessel portion 10 is increased to achieve quick cooking. Second, a coating layer 60 to be described later is formed on the first concavo-convex portion 20. The coating layer 60 fills the grooves between the projections which are densely arranged to serve as partitions, and thus do not easily peel off by means of an external force. Accordingly, the non-stick function can be effectively maintained to prevent the food from sticking to the surface of the vessel portion or to suppress the scratch occurrence during the cooking process. In the same manner, even during the cleaning process, the peel-off of the coating layer 60 is suppressed to permit the use of an iron cleaning sponge or brush. The role of the first concavo-convex portion 20 can be applied to second to fourth concavo-convex portions 30, 40, and 50 to be described later in the same manner, and thus the duplicate explanation thereof will be omitted.

The first concavo-convex portion 20 as described above may be variously changed in accordance with the kind and size of the vessel portion 10. In an embodiment of the present disclosure, it is described that the first concavo-convex portion 20 is successively formed on the bottom and the side portion of the vessel portion 10 up to a predetermined height. However, the first concavo-convex portion 20 may also be formed only on the bottom of the vessel portion 10 or on the overall side portion of the vessel portion 10.

On the other hand, the coating layer 60 is formed on the upper portion and the inner portion of the first concavo-convex portion 20 as described above to protect the outer surface of the vessel portion 10 against heat. Further, the coating layer 60 may be black to facilitate heat absorption, and may have the non-stick function to facilitate cleaning. The coating layer 60 may be formed with various colors in addition to black that facilitates heat absorption. The coating layer 60 may be formed using the Teflon coating agent or the ceramic coating agent in the related art, but it is preferable to use the ceramic coating agent that is innoxious to the human body as compared with the Teflon.

Since the first concavo-convex portion 20 and the coating layer 60 can be formed on the vessel portion 10 using the same method as the method in the related art, further detailed explanation thereof will be omitted. The second to fourth concavo-convex portions 30, 40, and 50 and the coating layer 60 can be formed in the same manner as described above.

The second concavo-convex portion 30 is further formed on a boundary line of the first concavo-convex portion 20 that is formed on the outer surface of the vessel portion 10 to finish the first concavo-convex portion 20. The second concavo-convex portion 30 serves to finely finish the first concavo-convex portion 20, and includes third projections 31 formed in a solid line and positioned in a horizontal direction and fourth projections 33 formed in a solid line and positioned in a diagonal direction.

That is, the first projections 21 of the first concavo-convex portion 20 as described above is formed in a honeycomb shape and thus may not have a fine appearance since the boundary line thereof is not uniformly finished. Accordingly, the second concavo-convex portion 30 can neatly finish the boundary line of the first projections 21 to satisfy the fineness of the external appearance of the vessel portion 10.

The third projections 31 of the second concavo-convex portion 30 are formed to be stacked in a horizontal direction in a state where three of the third projections 31 are spaced apart from each other for a predetermined distance, and the fourth projections 33 are formed on an inner lower side and an upper side of the third projections 31 in different directions.

The third projections 31 may be formed in a wave shape or in a dotted line. Further, the fourth projections 33 may be formed in the same diagonal direction or in a dotted line.

On the other hand, the coating layer 60 is formed on the upper portion and the inner portion of the second concavo-convex portion 30 as described above to protect the outer surface of the vessel portion 10 against heat. Further, the coating layer 60 may be black to facilitate heat absorption, and may have the non-stick function to facilitate cleaning. The coating layer 60 may be formed with various colors in addition to black that facilitates heat absorption. The coating layer 60 may be formed using the Teflon coating agent or the ceramic coating agent in the related art, but it is preferable to use the ceramic coating agent that is innoxious to the human body as compared with the Teflon.

The third concavo-convex portion 40 is further formed on an inner bottom surface of the vessel portion 10 as described above. The third concavo-convex portion 40 has the non-stick function to prevent the food being cooked from sticking to the bottom of the vessel portion 10 and to protect the coated surface.

Referring to FIG. 4, the third concavo-convex portion 40 is composed of fifth projections 41 and sixth projections 43 formed in a dotted line. The fifth projections 41 are repeatedly formed in a honeycomb shape, and the sixth projections 43 are formed in "*" shape so that opposite vertices among inner vertices of the fifth projections 41 are connected to each other.

That is, six honeycombs that are different from each other are repeatedly formed on six sides of a regularly hexagonal honeycomb, and the fifth projections 41 are successively arranged on the inner bottom surface of the vessel portion 10 in the above-described pattern. Further, the sixth projections 43 are formed by three dotted lines that connect the inner vertices of the regularly hexagonal honeycomb to each other, and the three dotted lines cross each other at the inner center point of the honeycomb.

On the other hand, the coating layer 60 is formed on the upper portion and the inner portion of the third concavo-convex portion 40 as described above. The coating layer 60 has the non-stick function to prevent the food from sticking to the coating layer 60 during cooking and to facilitate the cleaning. In this case, the coating layer 60 may be black to facilitate heat absorption, but may be formed with various colors in addition to black. The coating layer 60 may be formed using the Teflon coating agent or the ceramic coating agent in the related art, but it is preferable to use the ceramic coating agent that is innoxious to the human body as compared with the Teflon.

The fourth concavo-convex portion 50 is further formed on an inner side surface of the vessel portion 10 as described above. In the same manner as the third concavo-convex portion 40 as described above, the fourth concavo-convex portion 40 has the non-stick function to prevent the food being cooked from sticking to the bottom of the vessel portion 10 and to protect the coated surface.

As illustrated in FIG. 5, the fourth concavo-convex portion 50 is composed of seventh projections 51 formed in a solid line and eighth projections 53 formed in a dotted line. The seventh projections 51 are repeatedly formed in a honeycomb shape, and the eighth projections 53 are formed in "*" shape so that opposite vertices among inner vertices of the seventh projections 51 are connected to each other.

That is, six honeycombs that are different from each other are repeatedly formed on six sides of a regularly hexagonal honeycomb, and the seventh projections 51 are successively arranged on the inner bottom surface of the vessel portion 10 in the above-described pattern. Further, the eighth projections 53 are formed by three dotted lines that connect the inner vertices of the regularly hexagonal honeycomb to each other, and the three dotted lines cross each other at the inner center point of the honeycomb.

On the other hand, the coating layer 60 is formed on the upper portion and the inner portion of the fourth concavo-convex portion 50 as described above. The coating layer 60 has the non-stick function to prevent the food from sticking to the coating layer 60 during cooking and to facilitate the cleaning. In this case, the coating layer 60 may be black to facilitate heat absorption, but may be formed with various colors in addition to black. The coating layer 60 may be formed using the Teflon coating agent or the ceramic coating agent in the related art, but it is preferable to use the ceramic coating agent that is innoxious to the human body as compared with the Teflon.

The coating layer 60 formed on the inner portions of the first to fourth concavo-convex portions 20, 30, 40, and 50 is formed with a height that is lower than the projection height of the first to fourth concavo-convex portions 20, 30, 40, and 50. This is to make the respective concavo-convex portions project from the surface of the vessel portion 10.

That is, in the case where the respective concavo-convex portions project from the surface of the vessel portion 10, the coating layer 60 can be easily positioned therein, the heat transfer area can be increased, and the slipping and scratching can be prevented.

According to the cooking vessel 1 having the concavo-convex coating layer formed thereon as described above, since the concavo-convex portions are formed on the outer surface of the metal cooking vessel, such as a frypan, and the black coating layer is formed on the upper portion and the inner portion of the concavo-convex portions, the quick cooking can be achieved through the enlarged heat transfer area and the prominent heat absorption through the black coating layer, the scratching or slipping can be prevented from occurring, and the cleaning of the cooking vessel can be easily performed through the non-stick function.

Although the present disclosure has been described with reference to the preferred embodiments in the attached figures, it is noted that equivalents may be employed and substitutions made herein without departing from the scope of the disclosure as recited in the claims.

What is claimed is:

1. A cooking vessel comprising:
a vessel portion configured to accommodate a food material to be cooked therein;
a first concavo-convex portion formed on an outer surface of the vessel portion and including first projections formed in a solid line and second projections formed in a dotted line;
a coating layer formed on an upper portion and an inner portion of the first concavo-convex portion;
a third concavo-convex portion formed on an inner bottom surface of the vessel portion, wherein the third concavo-convex portion includes fifth projections and sixth projections formed in a dotted line;
a coating layer formed on an upper portion and an inner portion of the third concavo-convex portion;
a fourth concavo-convex portion formed on an inner side surface of the vessel portion, wherein the fourth concavo-convex portion includes seventh projections formed in a solid line and eighth projections formed in a dotted line; and
a coating layer formed on an upper portion and an inner portion of the fourth concavo-convex portion,
wherein
the fifth projections are repeatedly formed in a honeycomb shape, and the sixth projections are formed to extend between opposite vertices among inner vertices of the fifth projections, and
the seventh projections are repeatedly formed in a honeycomb shape, and the eighth projections are formed to extend between opposite vertices among inner vertices of the seventh projections.

2. The cooking vessel according to claim 1, further comprising a second concavo-convex portion formed on a boundary line of the first concavo-convex portion that is formed on the outer surface of the vessel portion to finish the first concavo-convex portion,
wherein the second concavo-convex portion includes third projections formed in a solid line and positioned in a horizontal direction and fourth projections formed in a solid line and positioned in a diagonal direction.

3. The cooking vessel according to claim 2, wherein the third projections are formed to be stacked in a horizontal direction in a state where three of the third projections are spaced apart from each other for a predetermined distance, and the fourth projections are formed on an inner lower side and an upper side of the third projections in different directions.

4. The cooking vessel according to claim 3, further comprising a coating layer formed on an upper portion and an inner portion of the second concavo-convex portion.

5. The cooking vessel according to claim 4, wherein the coating layers formed on the inner portions of the first and second concavo-convex portions are formed with a height that is lower than a projection height of the first and second concavo-convex portions.

6. The cooking vessel according to claim 1, wherein the first projections are repeatedly formed in a honeycomb shape, and the second projections are formed to extend between opposite vertices among inner vertices of the first projections.

7. The cooking vessel according to claim 1, wherein the coating layers formed on the inner portions of the first and third concavo-convex portions are formed with a height that is lower than a projection height of the first and third concavo-convex portions.

8. The cooking vessel according to claim 1, wherein the coating layers formed on the inner portions of the first and fourth concavo-convex portions are formed with a height that is lower than a projection height of the first and fourth concavo-convex portions.

* * * * *